US012691604B2

(12) United States Patent
Kenjo

(10) Patent No.: US 12,691,604 B2
(45) Date of Patent: Jul. 28, 2026

(54) STAPLER

(71) Applicant: Max Co., Ltd., Tokyo (JP)

(72) Inventor: Tatsuya Kenjo, Tokyo (JP)

(73) Assignee: Max Co., Ltd., Tokyo (JP)

(*) Notice: Subject to any disclaimer, the term of this patent is extended or adjusted under 35 U.S.C. 154(b) by 0 days.

(21) Appl. No.: 18/756,958

(22) Filed: Jun. 27, 2024

(65) Prior Publication Data

US 2025/0001642 A1 Jan. 2, 2025

(30) Foreign Application Priority Data

Jun. 30, 2023 (JP) ................................ 2023-107869

(51) Int. Cl.
*B27F 7/19* (2006.01)
*B27F 7/38* (2006.01)

(52) U.S. Cl.
CPC . *B27F 7/19* (2013.01); *B27F 7/38* (2013.01)

(58) Field of Classification Search
CPC .................................... B27F 7/19; B27F 7/38
USPC .......................................................... 227/108
See application file for complete search history.

(56) References Cited

U.S. PATENT DOCUMENTS

| | | | | | |
|---|---|---|---|---|---|
| 6,050,471 | A | 4/2000 | Yagi | | |
| 2005/0039319 | A1* | 2/2005 | Aldana | ..................... | B42B 4/00 29/818 |
| 2008/0061102 | A1* | 3/2008 | Hakozaki | .................. | B27F 7/38 227/82 |

FOREIGN PATENT DOCUMENTS

| | | | |
|---|---|---|---|
| EP | 2246162 | B1 | 9/2011 |
| JP | 3346194 | B2 | 11/2002 |
| JP | 4513443 | B2 | 7/2010 |

OTHER PUBLICATIONS

Aug. 3, 20240—(EP) Extended Search Report—App 24185065.0.

* cited by examiner

*Primary Examiner* — Praachi M Pathak
(74) *Attorney, Agent, or Firm* — Banner & Witcoff, Ltd.

(57) ABSTRACT

A stapler includes: a driver configured to drive a staple into a sheet, the staple having a crown and a pair of legs; a clincher configured to bend the legs driven into and penetrating the sheet; and a support portion configured to support the driver such that the driver is movable in a driving-in direction of the staple, in which the support portion is configured to pivotably support the driver such that the driver is rotatable along an axial direction of the crown in a state where the staple is set in a driving-in position.

14 Claims, 7 Drawing Sheets

STAPLER

CROSS-REFERENCE TO RELATED APPLICATIONS

The present application claims priority from Japanese Patent Application 2023-107869 filed on Jun. 30, 2023, the entire contents of which are incorporated herein by reference.

TECHNICAL FIELD

The present disclosure relates to a stapler configured to bind a sheet with a staple.

BACKGROUND ART

There is proposed a stapler in which a driver for driving out a staple is supported by a drive shaft (for example, see JP4513443B). In such a stapler, both left and right sides of the driver are supported by the drive shaft.

There is further proposed a technique of pressing a center of a driver with a T-bolt for adjusting a vertical position of the driver (for example, see JP3346194B).

SUMMARY

In the stapler in the related art, the driver inclines accordingly when the drive shaft (pin) inclines due to bending or the like. When the driver inclines, a difference occurs between a force applied to one staple leg and a force applied to the other staple leg in operation of pressing the staple by the driver. Accordingly, the staple may buckle due to the uniform forces applied to the pair of staple legs.

Illustrative aspects of the present invention provide a stapler in which a driver is prevented from inclining and forces applied to a pair of staple legs are uniform.

One illustrative aspect of the present disclosure provides a stapler including: a driver configured to drive a staple into a sheet, the staple having a crown and a pair of legs; a clincher configured to bend the legs driven into and penetrating the sheet; and a support portion configured to support the driver such that the driver is movable in a driving-in direction of the staple. The support portion is configured to pivotably support the driver such that the driver is rotatable along an axial direction of the crown in a state where the staple is set in a driving-in position.

In the present disclosure, the driver and the support portion relatively pivot along the axial direction of the crown when the staple is set in the driving-in position. Accordingly, the driver is prevented from inclining relative to the axial direction of the crown when the staple is set in the driving-in position.

In the present disclosure, substantially uniform forces are applied to the first and second staple legs of the staple in operation of driving out the staple by the driver. Accordingly, the staple can be prevented from buckling due to uneven forces applied to the first and second staple legs.

DESCRIPTION OF EMBODIMENTS

Hereinafter, an illustrative embodiment of a stapler and a binding device including the stapler according to the present disclosure will be described with reference to the drawings.

Configuration Example of Stapler of Present Illustrative Embodiment

Figure 1A:
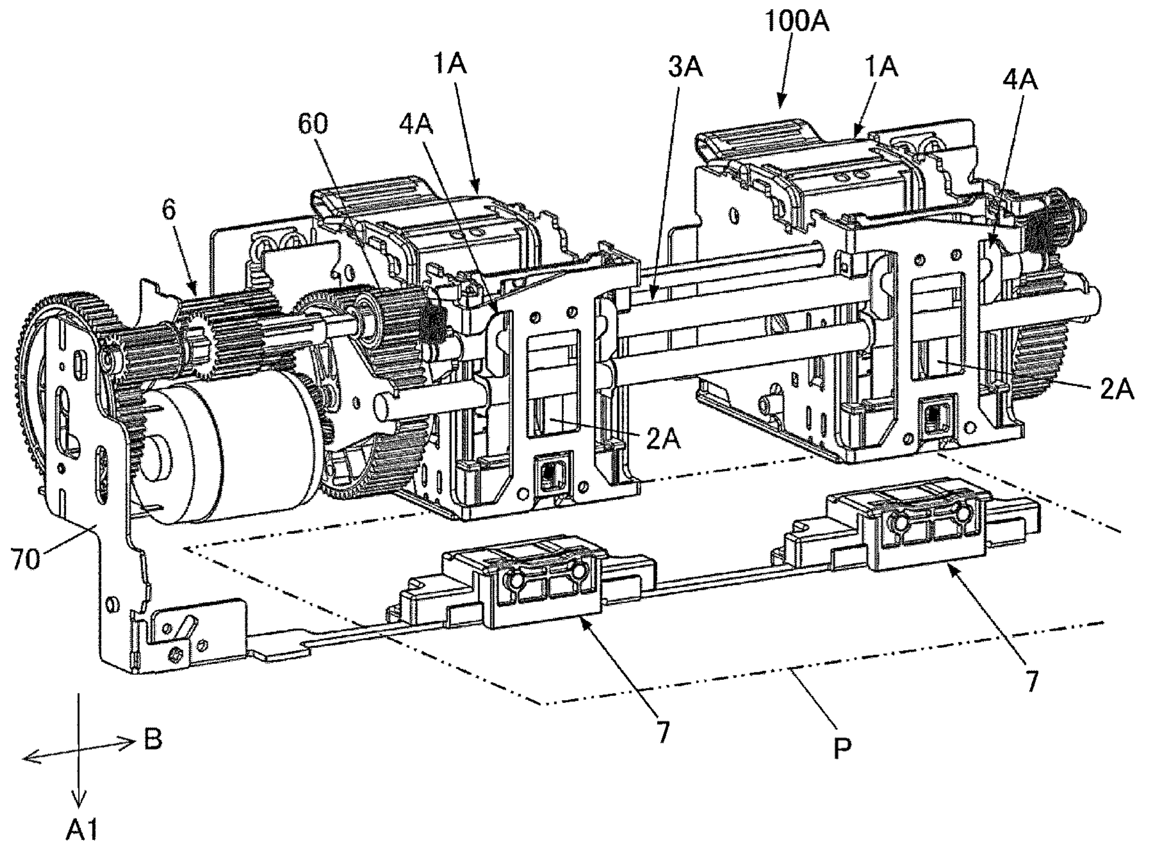
FIG. 1A is a perspective view illustrating an example of a binding device according to a present illustrative embodiment.
Figure 1B:
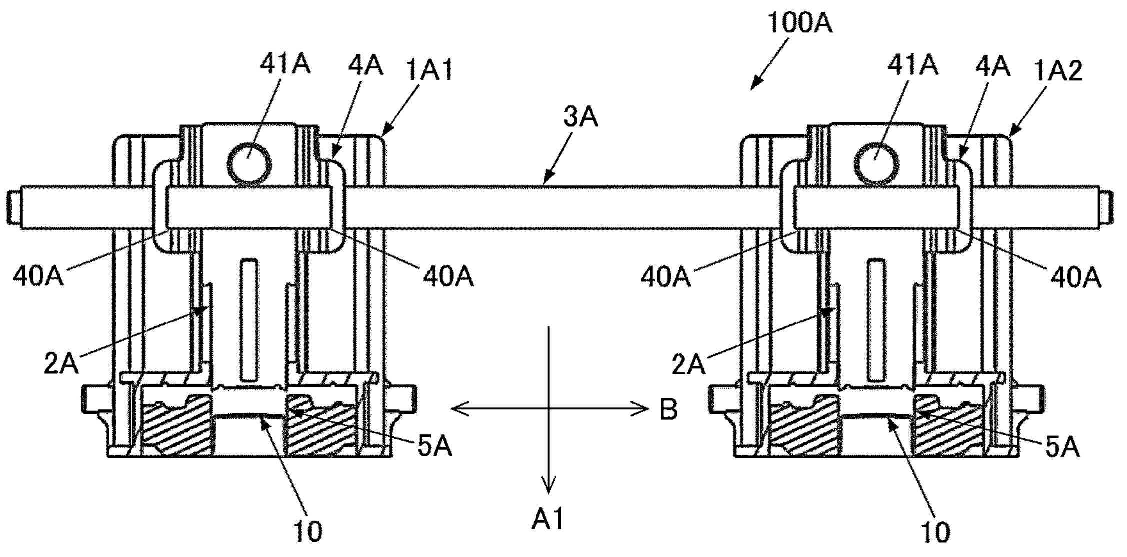
FIG. 1B is a front sectional view illustrating the example of the binding device according to the present illustrative embodiment.
Figure 2A:
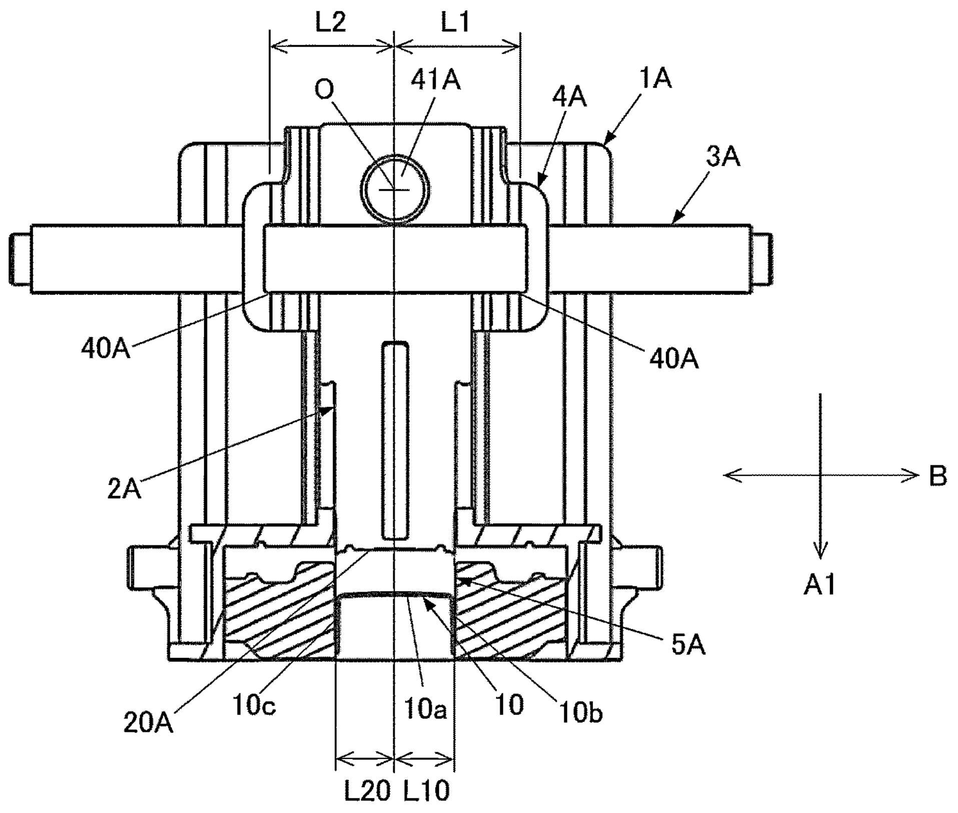
FIG. 2A is a front sectional view illustrating an example of a stapler according to the present illustrative embodiment.
Figure 2B:
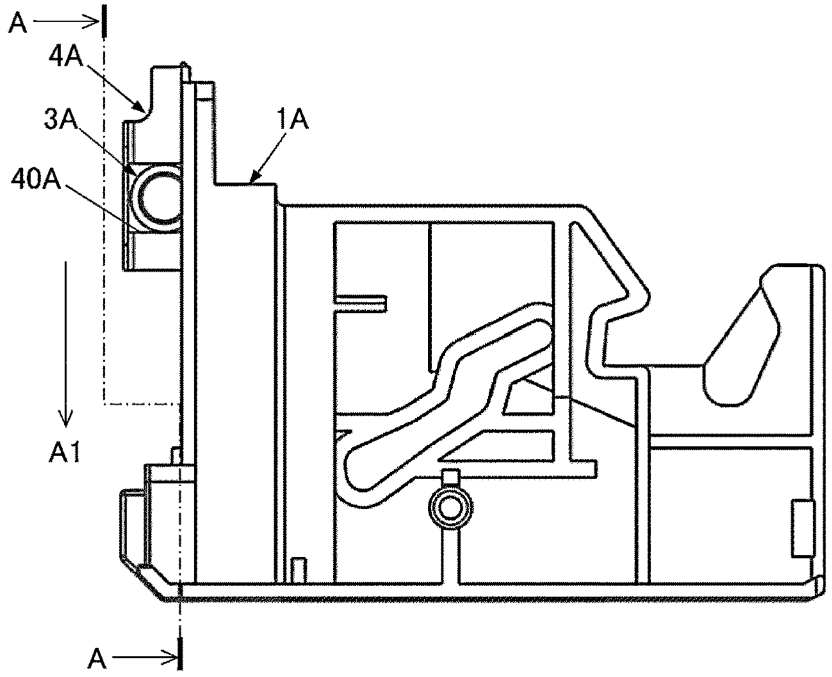
FIG. 2B is a side view illustrating the example of the stapler according to the present illustrative embodiment.
Figure 2C:
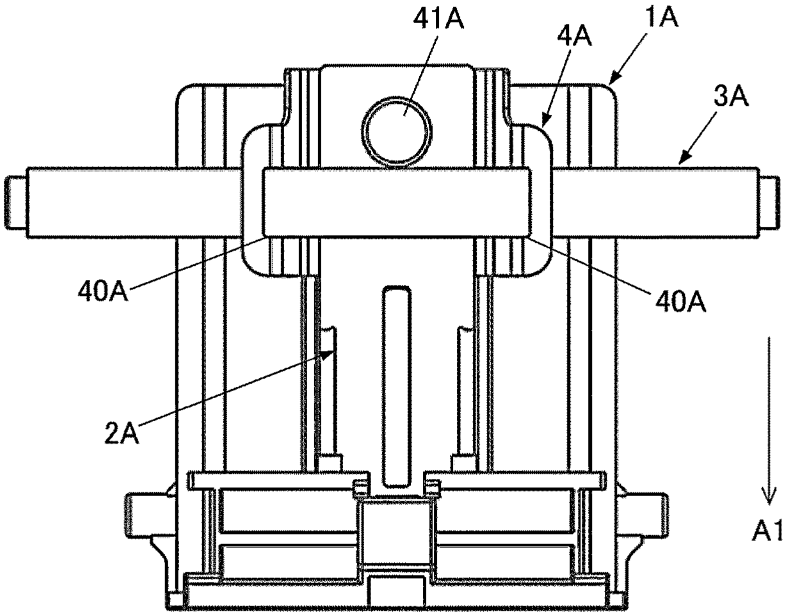
FIG. 2C is a front view illustrating the example of the stapler according to the present illustrative embodiment.

FIG. 1A is a perspective view illustrating an example of a binding device according to the present illustrative embodiment, and FIG. 1B is a front sectional view illustrating the example of the binding device according to the present illustrative embodiment. FIG. 2A is a front sectional view illustrating an example of a stapler according to the present illustrative embodiment, FIG. 2B is a side view illustrating the example of the stapler according to the present illustrative embodiment, and FIG. 2C is a front view illustrating the example of the stapler according to the present illustrative embodiment. FIG. 2A is a sectional view taken along a line A-A of FIG. 2B.

A binding device 100A includes at least one stapler 1A and an operating unit 6 that operates the stapler 1A. In the example of FIGS. 1A and 1B, two staplers 1A1 and 1A2 are operated by the single operating unit 6. The binding device including the stapler 1A and the operating unit 6 may be referred to as a stapler.

The stapler 1A includes a driver 2A that is configured to drive out a staple 10 and drives a pair of legs into a sheet P, a driver shaft 3A that moves the driver 2A, and a driver attachment portion 4A that pivotably supports the driver 2A and couples the driver 2A and the driver shaft 3A. The stapler 1A further includes a bending unit 7 that is configured to bend the pair of legs of the staple 10 driven into and penetrating the sheet P.

The staple 10 includes a first leg 10*b*, which is one of the pair of staple legs bent in a driving-in direction of the staple 10 indicated by an arrow A1, on one end portion of a staple crown 10*a*. The staple 10 further includes a second leg 10*c*, which is the other one of the pair of staple legs bent in the driving-in direction of the staple 10, on the other end portion of the staple crown 10*a*. An extending direction of the staple crown 10*a* is referred to as an axial direction.

The driver 2A is movably supported in the driving-in direction of the staple 10 and a direction opposite to the driving-in direction of the staple 10. The driver 2A has a rectangular plate shape with the driving-in direction of the staple 10 being a longitudinal direction. The driver 2A includes a pressing portion 20A that presses the staple crown 10*a* of the staple 10 against the end portions of the staple 10 along the driving-in direction. The pressing portion 20A is constituted by a side of the driver 2A in a lateral direction and extends in the axial direction of the staple crown 10*a*. In the driver 2A, a length of the pressing portion 20A in the extending direction (width in a left-right direction) is substantially the same as a length of the staple crown 10*a* in the axial direction.

The driver shaft 3A is an example of a support portion and extends along the axial direction of the staple crown 10*a* when the staple 10 is set in a driving-in position. The axial direction of the staple crown 10*a* when the staple 10 is set in the driving-in position is indicated by an arrow B. The driver shaft 3A extending along the axial direction of the staple crown 10*a* includes not only a case in which the driver shaft 3A extends parallel to the axial direction of the staple crown 10*a* but also a case in which the driver shaft 3A extends obliquely relative to the axial direction of the staple crown 10*a*. The same applies to a driver shaft of a modification to be described later. The driver shaft 3A is operated by an operating unit 6 including a motor, a gear, and the like, and moves in the driving-in direction of the staple 10 and the opposite direction thereof.

The driver attachment portion 4A is an example of the support portion and includes acting portions 40A that receive a force for moving the driver 2A in the driving-in direction of the staple 10 and a force for moving the driver 2A in the opposite direction thereof. The acting portions 40A are provided in two positions at a prescribed interval along the left-right direction intersecting the driving-in direction of the staple 10 and the opposite direction thereof. The pair of acting portions 40A are provided at an interval larger than a width of the driver 2A along the axial direction of the staple crown 10*a*. The acting portions 40A are holes into which the driver shaft 3A enters. When the acting portions 40A are square holes, lengths of a first side and a second side orthogonal to the first side are substantially the same as a diameter of the driver shaft 3A. When the acting portions 40A are circular holes, diameters thereof are substantially the same as the diameter of the driver shaft 3A.

The driver attachment portion 4A includes a support shaft 41A that pivotably supports the driver 2A. The support shaft 41A is provided on a side of the acting portions 40A that is along the direction opposite to the driving-in direction of the staple 10. The support shaft 41A has a columnar shape, and an axial direction of the column is orthogonal to the driver shaft 3A. In the driver attachment portion 4A, a center between the pair of acting portions 40A is aligned with a center of the support shaft 41A. That is, a distance L1 from one acting portion 40A to a center O of the support shaft 41A is equal to a distance L2 from the other acting portion 40A to the center O of the support shaft 41A. The distance L1 from one acting portion 40A to the center O of the support shaft 41A and the distance L2 from the other acting portion 40A to the center O of the support shaft 41A are distances along the extending direction of the driver shaft 3A entering the acting portions 40A. Accordingly, the support shaft 41A is provided at a center of the interval between the pair of acting portions 40A.

The driver 2A has an end portion along the direction opposite to the driving-in direction of the staple 10 supported on the driver attachment portion 4A by the support shaft 41A. In the driver 2A, a distance L10 from one end portion of the pressing portion 20A to the center O of the support shaft 41A is equal to a distance L20 from the other end portion of the pressing portion 20A to the center O of the support shaft 41A. The distance L10 from the one end portion of the pressing portion 20A to the center O of the support shaft 41A and the distance L20 from the other end portion of the pressing portion 20A to the center O of the support shaft 41A are distances along the extending direction of the pressing portion 20A. Accordingly, a center of the driver 2A in the axial direction of the staple crown 10*a* when the staple 10 is set in the driving-in position is supported by the support shaft 41A. Then, the driver 2A and the driver attachment portion 4A relatively pivot about the support shaft 41A as a fulcrum along the axial direction of the staple crown 10*a* when the staple 10 is set in the driving-in position.

The stapler 1A includes a guide portion 5A that guides the driver 2A moving in the driving-in direction of the staple 10 and the opposite direction thereof along the driving-in direction of the staple 10 and the opposite direction thereof. The guide portion 5A faces the pressing portion 20A of the driver 2A with a width equal to a length of the pressing portion 20A in the extending direction (width in the left-right direction), and extends along the driving-in direction of the staple 10 and the opposite direction thereof.

Accordingly, the driver 2A guided by the guide portion 5A and moving in the driving-in direction of the staple 10 and the opposite direction thereof is prevented from inclining relative to the driving-in direction of the staple 10 and the opposite direction thereof. Accordingly, the pressing portion 20A of the driver 2A is prevented from inclining relative to the axial direction of the staple crown 10*a* when the staple 10 is set in the driving-in position.

In the binding device 100A, one driver shaft 3A passes through the pair of acting portions 40A of the driver attachment portion 4A of the stapler 1A1 and the pair of acting portions 40A of the driver attachment portion 4A of the stapler 1A2. Accordingly, in the binding device 100A, the two staplers 1A1 and 1A2 are coupled by the one driver shaft 3A operated by the single operating unit 6. Further, a clincher (not illustrated) of the bending unit 7 is operated by the operating unit 6 via a transmission member 70.

Operation Example of Stapler of Present Illustrative Embodiment

Figure 3:
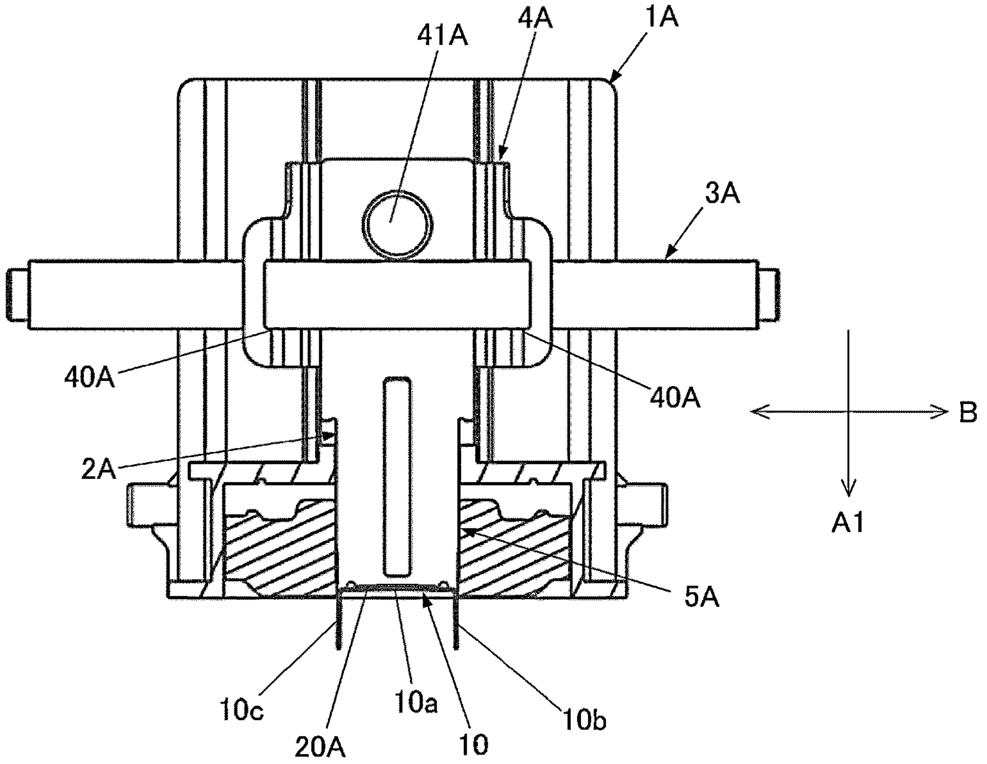
FIG. 3 is a front sectional view illustrating an example of operation of the stapler according to the present illustrative embodiment.
Figure 4A:
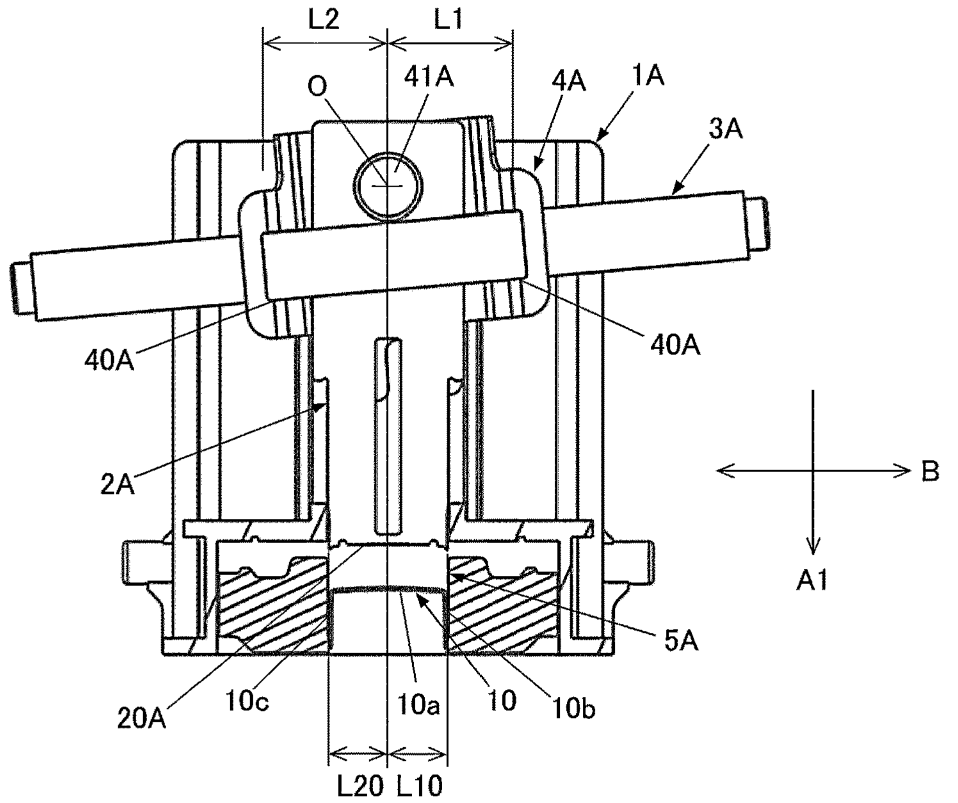
FIG. 4A is a front sectional view illustrating an example of operation of the stapler according to the present illustrative embodiment.
Figure 4B:
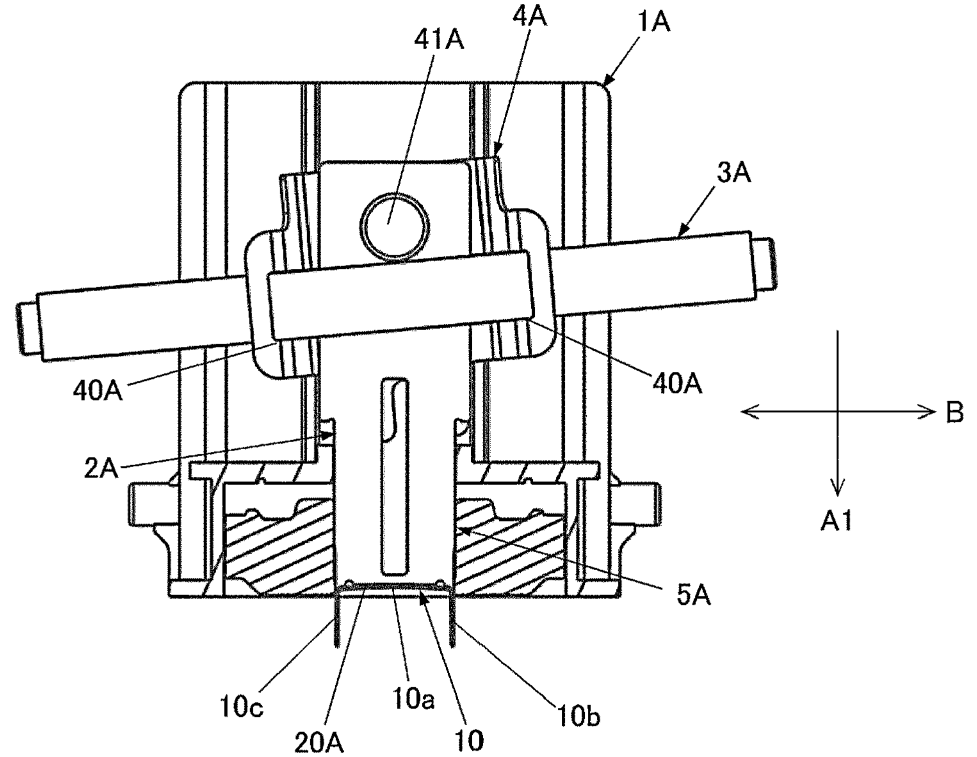
FIG. 4B is a front sectional view illustrating an example of operation of the stapler according to the present illustrative embodiment.

FIGS. 3, 4A, and 4B are front sectional views illustrating an example of operation of the stapler according to the present illustrative embodiment. FIG. 1A illustrates a state in which the driver 2A is in a standby position when the driver shaft 3A is parallel to the axial direction of the staple crown 10*a* without inclination when the staple 10 is set in the driving-in position. FIG. 3 illustrates a state in which the driver 2A moves from the standby position in the driving-in direction of the staple 10 when the driver shaft 3A is parallel to the axial direction of the staple crown 10*a* without inclination when the staple 10 is set in the driving-in position. FIG. 4A illustrates a state in which the driver 2A is in the standby position when the driver shaft 3A inclines relative to the axial direction of the staple crown 10*a* when the staple 10 is set in the driving-in position. FIG. 4B illustrates a state in which the driver 2A moves from the standby position in the driving-in direction of the staple 10 when the driver shaft 3A inclines relative to the axial direction of the staple crown 10*a* when the staple 10 is set in the driving-in position.

When the driver shaft 3A of the stapler 1A is operated by the operating unit 6 and moves in the driving-in direction of the staple 10 indicated by the arrow A1, the acting portions 40A of the driver attachment portion 4A are pressed by the driver shaft 3A in the driving-in direction of the staple 10.

The driver 2A is coupled to the driver attachment portion 4A by the support shaft 41A. Accordingly, the driver 2A is pressed in the driving-in direction of the staple 10 via the support shaft 41A of the driver attachment portion 4A, and moves from the standby position to a driving-out position. When the driver 2A moves from the standby position illustrated in FIGS. 1A and 4A in the driving-in direction of the staple 10 as illustrated in FIGS. 3 and 4B, the driver 2A is guided by the guide portion 5A.

Accordingly, the pressing portion 20A of the driver 2A is prevented from inclining relative to the axial direction of the staple crown 10*a* when the staple 10 is set in the driving-in position that is orthogonal to the driving-in direction of the staple 10 and is indicated by the arrow B. When the driver 2A moves from the standby position to the driving-out position, the pressing portion 20A presses the staple crown 10*a* of the staple 10 to drive out the staple 10.

The driver 2A and the driver attachment portion 4A relatively pivot about the support shaft 41A as a fulcrum along the axial direction of the staple crown 10*a* when the staple 10 is set in the driving-in position. In the driver 2A that is guided by the guide portion 5A and moves in the driving-in direction of the staple 10, the pressing portion 20A is prevented from inclining relative to the axial direction of the staple crown 10*a* when the staple 10 is set in the driving-in position.

As illustrated in FIGS. 1A and 3, when the driver shaft 3A does not incline relative to the axial direction of the staple crown 10*a* when the staple 10 is set in the driving-in position, the extending direction of the driver shaft 3A is parallel to the extending direction of the pressing portion 20A of the driver 2A guided by the guide portion 5A.

As illustrated in FIGS. 4A and 4B, when the driver shaft 3A inclines relative to the axial direction of the staple crown 10*a* when the staple 10 is set in the driving-in position due to deformation or the like, the driver 2A and the driver attachment portion 4A relatively pivot about the support shaft 41A as a fulcrum along the axial direction of the staple crown 10*a* when the staple 10 is set in the driving-in position. Accordingly, even when the driver shaft 3A inclines relative to the axial direction of the staple crown 10*a* when the staple 10 is set in the driving-in position, the pressing portion 20A of the driver 2A is prevented from inclining relative to the axial direction of the staple crown 10*a* when the staple 10 is set in the driving-in position.

Accordingly, no matter when the driver shaft 3A inclines or does not incline relative to the axial direction of the staple crown 10*a* when the staple 10 is set in the driving-in position, the pressing portion 20A of the driver 2A is prevented from inclining relative to the axial direction of the staple crown 10*a* when the staple 10 is set in the driving-in position.

The support shaft 41A is provided at the center of the interval between the pair of acting portions 40A. The center of the driver 2A in the axial direction of the staple crown 10*a* when the staple 10 is set in the driving-in position is supported by the support shaft 41A.

Accordingly, a force of pressing the pair of acting portions 40A of the driver attachment portion 4A by the driver shaft 3A in the driving-in direction of the staple 10 is applied to the center of the driver 2A along the axial direction of the staple crown 10*a* when the staple 10 is set in the driving-in position.

Accordingly, no matter when the driver shaft 3A inclines or does not incline relative to the axial direction of the staple crown 10*a* when the staple 10 is set in the driving-in position, forces applied from the pressing portion 20A to one end portion and the other end portion of the staple crown 10*a* are substantially uniform in operation of pressing the staple crown 10*a* of the staple 10 by the pressing portion 20A of the driver 2A.

Accordingly, substantially uniform forces are applied to the first staple leg 10*b* and the second staple leg 10*c* in the operation of driving out the staple 10 by the driver 2A. Accordingly, the staple 10 is prevented from buckling due to uneven forces applied to the first staple leg 10*b* and the second staple leg 10*c*.

In the binding device 100A illustrated in FIGS. 1A and 1B, the stapler 1A1 and the stapler 1A2 are coupled by one driver shaft 3A. Accordingly, a transmission mechanism 60 such as a gear or a link that transmits a driving force from the operating unit 6 to the one driver shaft 3A may be provided. Accordingly, the number of components can be reduced and costs can be reduced as compared with a configuration including the transmission mechanism 60 that transmits the driving force from the operating unit 6 to the driver shafts 3A of respective staplers.

On the other hand, in the binding device 100A, a driver shaft passing through the pair of acting portions 40A of the driver attachment portion 4A of the stapler 1A and a driver shaft passing through the pair of acting portions 40A of the driver attachment portion 4A of the stapler 1A2 are connected between the stapler 1A and the stapler 1A2 to constitute the one driver shaft 3A. For this reason, the driver shaft 3A is longer than that of the stapler 1A illustrated in FIG. 2A and the like by an amount connecting the stapler 1A and the stapler 1A2. When the driver shaft 3A is longer, deformation such as bending is likely to occur.

However, even when the driver shaft 3A inclines relative to the axial direction of the staple crown 10*a* when the staple 10 is set in the driving-in position, the pressing portion 20A of the driver 2A is prevented from inclining relative to the axial direction of the staple crown 10*a* when the staple 10 is set in the driving-in position. Further, the force of the pair of acting portions 40A of pressing the driver attachment portion 4A by the driver shaft 3A in the driving-in direction of the staple 10 is applied to the center of the driver 2A along the axial direction of the staple crown 10*a* when the staple 10 is set in the driving-in position.

Accordingly, even when the driver shaft 3A inclines due to deformation such as bending relative to the axial direction of the staple crown 10*a* when the staple 10 is set in the driving-in position, substantially uniform forces are applied to the first staple leg 10*b* and the second staple leg 10*c* in the operation of driving out the staple 10 by the driver 2A. Accordingly, the driver shaft 3A is allowed to deform, and the staple 10 is prevented from buckling due to uneven forces applied to the first staple leg 10*b* and the second staple leg 10*c*.

Modifications of Stapler of Present Illustrative Embodiment

Figure 5A:
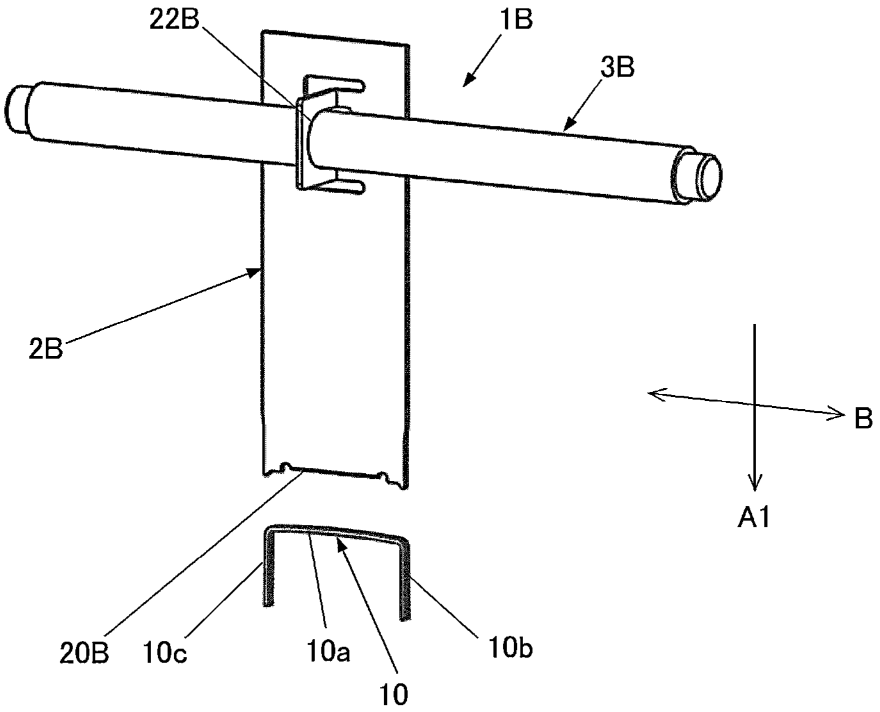
FIG. 5A is a perspective view illustrating a first modification of the stapler according to the present illustrative embodiment.
Figure 5B:
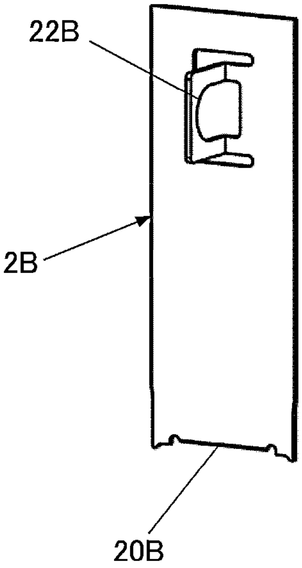
FIG. 5B is a perspective view of a driver of the first modification of the stapler according to the present illustrative embodiment.

FIG. 5A is a perspective view of a first modification of the stapler according to the present illustrative embodiment, and FIG. 5B is a perspective view of a driver according to the first modification of the stapler according to the present illustrative embodiment.

A stapler 1B according to the first modification includes a driver 2B that drives out the staple 10, and a driver shaft 3B that moves the driver 2B in the driving-in direction of the staple 10 and the opposite direction thereof and pivotably supports the driver 2B along the axial direction of the staple crown 10*a* when the staple 10 is set in the driving-in position.

The driver 2B is movably supported in the driving-in direction of the staple 10 indicated by the arrow A1 and the opposite direction thereof. The driver 2B has a rectangular plate shape with the driving-in direction of the staple 10 and the opposite direction thereof being the longitudinal direction. The driver 2B includes a pressing portion 20B that presses the staple crown 10*a* of the staple 10 against the end portions of the staple 10 along the driving-in direction. The driver 2B includes, at an end portion along the opposite direction of the driving-in direction of the staple 10, an acting portion 22B that is supported by the driver shaft 3B and receives a force for moving the driver 2B in the driving-in direction of the staple 10 and a force for moving the driver 2B in the opposite direction. The acting portion 22B is a hole into which the driver shaft 3B enters, and in which a gap is defined between the driver shaft 3B and the acting portion 22B such that the driver shaft 3B is rotatable relative to the driver shaft 2B along the axial direction of the staple crown 10*a* when the staple 10 is set in the driving-in position. In the driver 2B, the acting portion 22B is provided at the center along the axial direction of the staple crown 10*a* when the staple 10 is set in the driving-in position that is the extending direction of the pressing portion 20B.

The driver shaft 3B is an example of the support portion and extends along the axial direction of the staple crown 10*a* when the staple 10 is set in the driving-in position indicated by the arrow B. The driver shaft 3B is operated by an operating unit (not illustrated) including a motor, a gear, and the like, and moves in the driving-in direction of the staple 10 and the opposite direction thereof.

Accordingly, the center of the driver 2B along the axial direction of the staple crown 10*a* when the staple 10 is set in the driving-in position, which is the extending direction of the pressing portion 20B, is supported by the driver shaft 3B via the acting portion 22B. The driver 2B and the driver shaft 3B relatively pivot about the acting portion 22B as a fulcrum along the axial direction of the staple crown 10*a* when the staple 10 is set in the driving-in position.

The stapler 1B includes a guide portion (not illustrated) that guides the driver 2B moving in the driving-in direction of the staple 10 and the opposite direction thereof along the driving-in direction of the staple 10 and the opposite direction thereof.

In the stapler 1B, the driver 2B and the driver shaft 3B relatively pivot about the acting portion 22B as a fulcrum along the axial direction of the staple crown 10*a* when the staple 10 is set in the driving-in position. Accordingly, in the driver 2B that is guided by the guide portion (not illustrated) and moves in the driving-in direction of the staple 10, the pressing portion 20B is prevented from inclining relative to the axial direction of the staple crown 10*a* when the staple 10 is set in the driving-in position.

Further, the force of pressing the acting portion 22B of the driver 2B by the driver shaft 3B in the driving-in direction of the staple 10 is applied to the center of the driver 2B along the axial direction of the staple crown 10*a* when the staple 10 is set in the driving-in position.

Accordingly, no matter when the driver shaft 3B inclines or does not incline relative to the axial direction of the staple crown 10*a* when the staple 10 is set in the driving-in position, forces applied from the pressing portion 20B to one end portion and the other end portion of the staple crown 10*a* are substantially uniform in operation of pressing the staple crown 10*a* of the staple 10 by the pressing portion 20B of the driver 2B.

Accordingly, substantially uniform forces are applied to the first staple leg 10*b* and the second staple leg 10*c* in the operation of driving out the staple 10 by the driver 2B. Accordingly, the stapler 1B does not include a driver attachment portion as the support portion, and the staple 10 is prevented from buckling due to uneven forces applied to the first staple leg 10*b* and the second staple leg 10*c*.

Figure 6A:
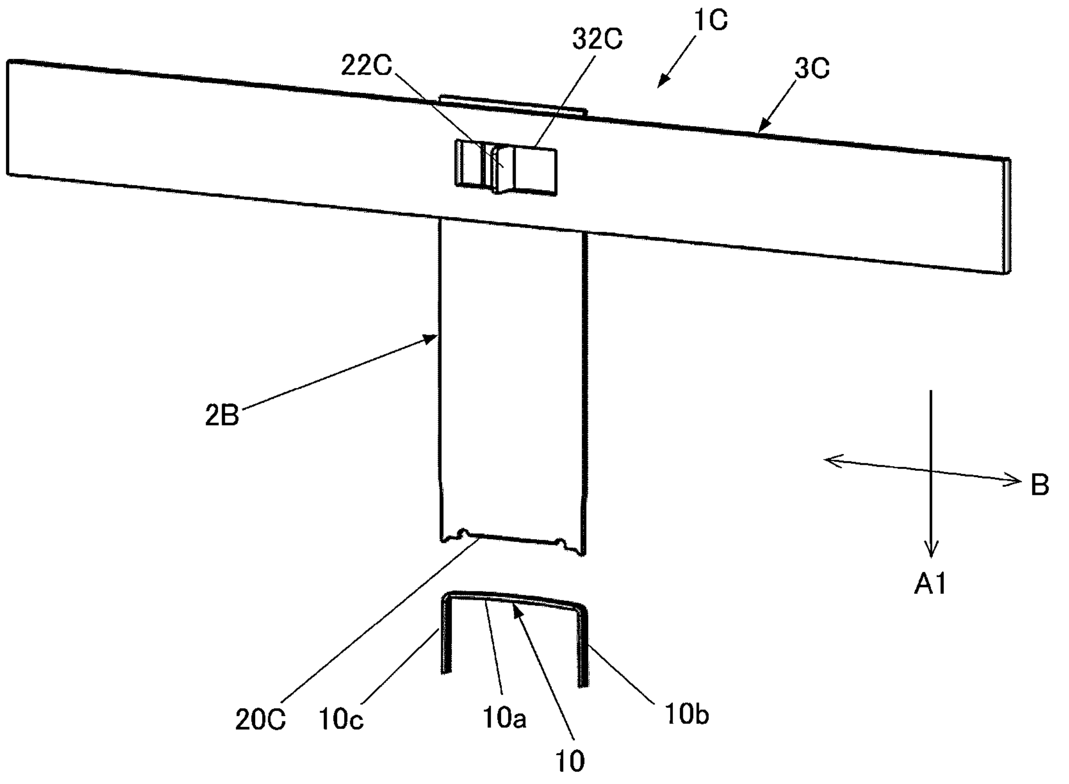
FIG. 6A is a perspective view illustrating a second modification of the stapler according to the present illustrative embodiment.
Figure 6B:
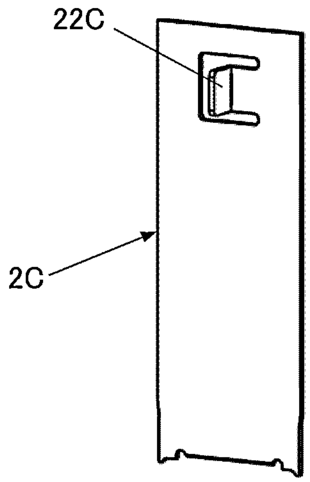
FIG. 6B is a perspective view of a driver of the second modification of the stapler according to the present illustrative embodiment.

FIG. 6A is a perspective view illustrating a second modification of the stapler according to the present illustrative embodiment, and FIG. 6B is a perspective view of a driver of the second modification of the stapler according to the present illustrative embodiment.

A stapler 1C according to the second modification includes a driver 2C that drives out the staple 10, and a driver shaft 3C that moves the driver 2C in the driving-in direction of the staple 10 and the opposite direction thereof and pivotably supports the driver 2C along the axial direction of the staple crown 10*a* when the staple 10 is set in the driving-in position.

The driver 2C is movably supported in the driving-in direction of the staple 10 indicated by the arrow A1 and the opposite direction thereof. The driver 2C has a rectangular plate shape with the driving-in direction of the staple 10 and the opposite direction thereof being the longitudinal direction. The driver 2C includes a pressing portion 20C that presses the staple crown 10*a* of the staple 10 against the end portions of the staple 10 along the driving-in direction. The driver 2C includes, at an end portion along the opposite direction of the driving-in direction of the staple 10, an acting portion 22C that is supported by the driver shaft 3B and receives a force for moving the driver 2C in the driving-in direction and a force for moving the driver 2C in the opposite direction. The acting portion 22C is a protrusion on the driver 2C. In the driver 2C, the acting portion 22C is provided at the center along the axial direction of the staple crown 10*a* when the staple 10 is set in the driving-in position.

The driver shaft 3C is an example of the support portion and extends along the axial direction of the staple crown 10*a* when the staple 10 is set in the driving-in position. The driver shaft 3C is operated by an operating unit (not illustrated) including a motor, a gear, and the like, and moves in the driving-in direction of the staple 10 and the opposite direction thereof.

The driver shaft 3C has a plate shape and includes an acted portion 32C into which the acting portion 22C of the driver 2C enters. The acted portion 32C is a hole in which a gap is defined between the acted portion 32C and the acting portion 22C such that the driver shaft 3C is rotatable relative to the driver shaft 2C along the axial direction of the staple crown 10*a* when the staple 10 is set in the driving-in position.

Accordingly, the center of the driver 2C along the axial direction of the staple crown 10*a* when the staple 10 is set in the driving-in position is supported by the acted portion 32C of the driver shaft 3C via the acting portion 22C. The driver 2C and the driver shaft 3C relatively pivot about the acting portion 22C as a fulcrum along the axial direction of the staple crown 10*a* when the staple 10 is set in the driving-in position.

The stapler 1C includes a guide portion (not illustrated) that guides the driver 2C moving in the driving-in direction of the staple 10 and the opposite direction thereof along the driving-in direction of the staple 10 and the opposite direction thereof.

In the stapler 1C, the driver 2C and the driver shaft 3C relatively pivot about the acting portion 22C as a fulcrum along the axial direction of the staple crown 10*a* when the staple 10 is set in the driving-in position. Accordingly, in the driver 2C that is guided by the guide portion (not illustrated) and moves in the driving-in direction of the staple 10, the pressing portion 20C is prevented from inclining relative to the axial direction of the staple crown 10*a* when the staple 10 is set in the driving-in position.

Further, the force of pressing the acting portion 22C of the driver 2C by the acted portion 32C of the driver shaft 3C in the driving-in direction of the staple 10 is applied to the center of the driver 2C along the axial direction of the staple crown 10*a* when the staple 10 is set in the driving-in position.

Accordingly, no matter when the driver shaft 3C inclines or does not incline relative to the axial direction of the staple crown 10*a* when the staple 10 is set in the driving-in position, forces applied from the pressing portion 20C to one end portion and the other end portion of the staple crown 10*a* are substantially uniform in operation of pressing the staple crown 10*a* of the staple 10 by the pressing portion 20C of the driver 2C.

Accordingly, substantially uniform forces are applied to the first staple leg 10*b* and the second staple leg 10*c* in the operation of driving out the staple 10 by the driver 2C. Accordingly, the stapler 1C does not include a driver attachment portion as the support portion, and the staple 10 is prevented from buckling due to uneven forces applied to the first staple leg 10*b* and the second staple leg 10*c*.

Figure 7A:
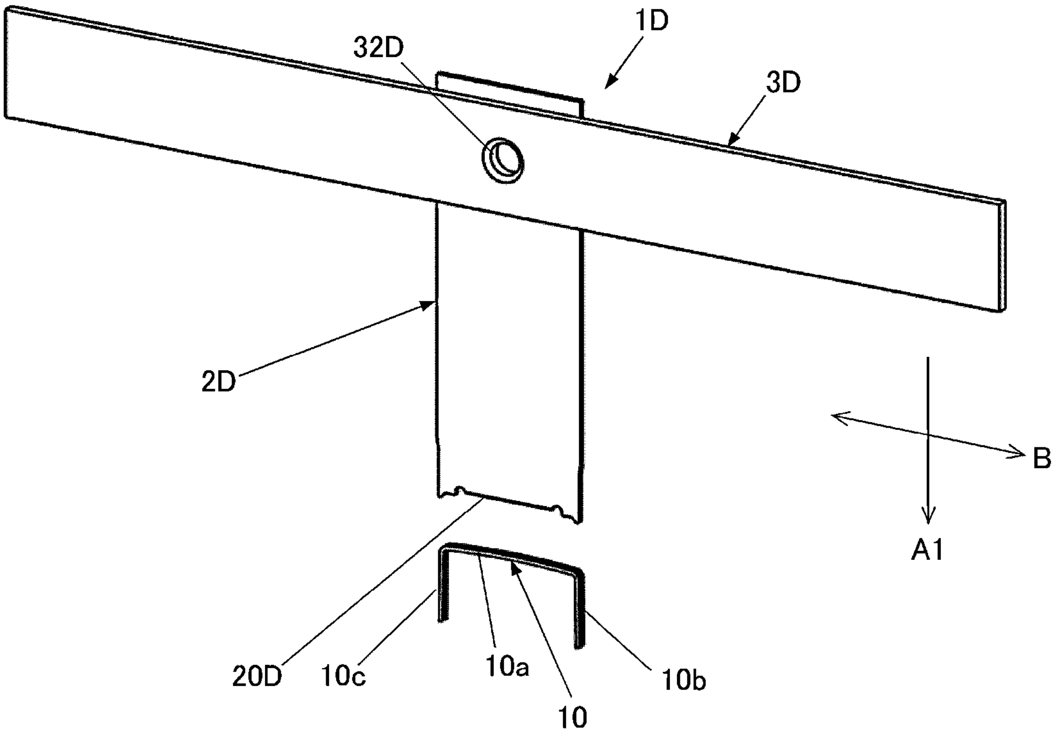
FIG. 7A is a perspective view illustrating a third modification of the stapler according to the present illustrative embodiment.
Figure 7B:
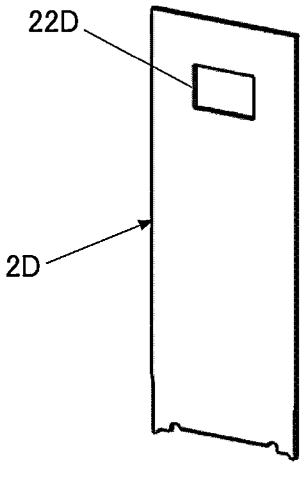
FIG. 7B is a perspective view of a driver of the third modification of the stapler according to the present illustrative embodiment.

FIG. 7A is a perspective view illustrating a third modification of the stapler according to the present illustrative embodiment, and FIG. 7B is a perspective view of a driver of the third modification of the stapler according to the present illustrative embodiment.

A stapler 1D according to the third modification includes a driver 2D that drives out the staple 10, and a driver shaft 3D that moves the driver 2D in the driving-in direction of the staple 10 and the opposite direction thereof and pivotably supports the driver 2D along the axial direction of the staple crown 10*a* when the staple 10 is set in the driving-in position.

The driver 2D is movably supported in the driving-in direction of the staple 10 and the opposite direction thereof. The driver 2D has a rectangular plate shape with the driving-in direction of the staple 10 and the opposite direction thereof being the longitudinal direction. The driver 2D includes a pressing portion 20D that presses the staple crown 10*a* of the staple 10 against the end portions of the staple 10 along the driving-in direction. The driver 2D includes, at an end portion along the opposite direction of the driving-in direction of the staple 10, an acting portion 22D that is supported by the driver shaft 3B and receives a force for moving the driver 2D in the driving-in direction and a force for moving the driver 2D in the opposite direction. The acting portion 22D is a hole penetrating front and back of the driver 2D. In the driver 2D, the acting portion 22D is provided in a position including the center along the axial direction of the staple crown 10*a* when the staple 10 is set in the driving-in position.

The driver shaft 3D is an example of the support portion and extends along the axial direction of the staple crown 10*a* when the staple 10 is set in a driving-in position. The driver shaft 3D is operated by an operating unit (not illustrated) including a motor, a gear, and the like, and moves in the driving-in direction of the staple 10 and the opposite direction thereof.

The driver shaft 3D has a plate shape and includes an acted portion 32D into which the acting portion 22D of the driver 2D enters. The acted portion 32D is a cylindrical protrusion in which a gap is defined between the acted portion 32D and the acting portion 22D such that the driver shaft 3D is rotatable relative to the driver shaft 2D along the axial direction of the staple crown 10*a* when the staple 10 is set in the driving-in position.

Accordingly, the center of the driver 2D along the axial direction of the staple crown 10*a* when the staple 10 is set in the driving-in position is supported by the acted portion 32D of the driver shaft 3D via the acting portion 22D. The driver 2D and the driver shaft 3D relatively pivot about the acted portion 32D as a fulcrum along the axial direction of the staple crown 10*a* when the staple 10 is set in the driving-in position.

The stapler 1D includes a guide portion (not illustrated) that guides the driver 2D moving in the driving-in direction of the staple 10 and the opposite direction thereof along the driving-in direction of the staple 10 and the opposite direction thereof.

In the stapler 1D, the driver 2D and the driver shaft 3D relatively pivot about the acted portion 32D as a fulcrum along the axial direction of the staple crown 10*a* when the staple 10 is set in the driving-in position. Accordingly, in the driver 2D that is guided by the guide portion (not illustrated) and moves in the driving-in direction of the staple 10, the pressing portion 20D is prevented from inclining relative to the axial direction of the staple crown 10*a* when the staple 10 is set in the driving-in position.

Further, the force of pressing the acting portion 22D of the driver 2D by the acted portion 32D of the driver shaft 3D in the driving-in direction of the staple 10 is applied to the center of the driver 2D along the axial direction of the staple crown 10*a* when the staple 10 is set in the driving-in position.

Accordingly, no matter when the driver shaft 3D inclines or does not incline relative to the axial direction of the staple crown 10*a* when the staple 10 is set in the driving-in position, forces applied from the pressing portion 20D to one end portion and the other end portion of the staple crown 10*a* are substantially uniform in operation of pressing the staple crown 10*a* of the staple 10 by the pressing portion 20D of the driver 2D.

Accordingly, substantially uniform forces are applied to the first staple leg 10*b* and the second staple leg 10*c* in the operation of driving out the staple 10 by the driver 2D. Accordingly, the stapler 1D does not include a driver attachment portion as the support portion, and the staple 10 is prevented from buckling due to uneven forces applied to the first staple leg 10*b* and the second staple leg 10*c*.

What is claimed is:

1. A stapler comprising:

a driver configured to drive a staple into a sheet, the staple having a crown and a pair of legs;

a clincher configured to bend the legs driven into and penetrating the sheet; and a support portion configured to support the driver such that the driver is movable in a driving-in direction of the staple, wherein the support portion includes an attachment part, and wherein the attachment part is configured to pivotably support the driver relative to the support portion such that the driver is rotatable about a rotational axis that is relative to the support portion, the rotational axis being perpendicular to the driving-in direction of the staple and, with the staple set in a driving-in position, perpendicular to an axial direction of the crown.

2. The stapler according to claim 1, further comprising:

a guide portion configured to guide the driver in the driving-in direction when the staple is driven into the sheet by the driver.

3. The stapler according to claim 1, wherein the attachment part of the support portion is configured to pivotably support a center position of the driver in the axial direction.

4. The stapler according to claim 3, wherein the support portion includes:

a driver attachment portion as the attachment part, the driver attachment portion being configured to pivotably support the driver; and a driver shaft extending along the axial direction and configured to move the driver attachment portion in the driving-in direction.

5. The stapler according to claim 4, wherein the driver and the driver shaft are rotatable relative to each other so that the driver faces the driving-in direction.

6. The stapler according to claim 5, wherein the driver attachment portion includes a support shaft, and wherein the rotational axis corresponds to a longitudinal axis of the support shaft, the rotational axis being orthogonal to the driver shaft.

7. The stapler according to claim 4, wherein the driver attachment portion has an acting portion that is contactable with the driver shaft to receive a force for moving the driver in the driving-in direction and a force for moving the driver in an opposite direction opposite to the driving-in direction.

8. The stapler according to claim 4, further comprising:

an operating component configured to operate the driver.

9. The stapler according to claim 3, wherein the support portion includes a driver shaft extending in the axial direction, the driver shaft being configured to pivotably support the driver to move the driver in the driving-in direction.

10. A binding device comprising:

a plurality of staplers, each of the staplers including:

a driver configured to drive a staple into a sheet, the staple having a crown and a pair of legs;

a clincher configured to bend the legs driven into and penetrating the sheet; and a support portion configured to support the driver such that the driver is movable in a driving-in direction of the staple, wherein the support portion includes an attachment part, wherein the attachment part is configured to pivotably support the driver relative to the support portion such that the driver is rotatable about a rotational axis that is relative to the support portion, the rotational axis being perpendicular to the driving-in direction of the staple and, with the staple set in a driving-in position, perpendicular to an axial direction of the crown, wherein the attachment part of the support portion is configured to pivotably support a center position of the driver in the axial direction, and wherein the support portion further includes:

a driver attachment portion as the attachment part, the driver attachment portion being configured to pivotably support the driver; and a driver shaft extending along the axial direction and configured to move the driver attachment portion in the driving-in direction; and a single operating component configured to operate the plurality of the staplers, wherein the driver shaft of the plurality of staplers is a single driver shaft passing through each of the driver attachment portions of the plurality of staplers.

11. The binding device according to claim 10, wherein the driver and the driver shaft are rotatable relative to each other so that the driver faces the driving-in direction.

12. The binding device according to claim 11, wherein the driver attachment portion includes a support shaft, and wherein the rotational axis corresponds to a longitudinal axis of the support shaft, the rotational axis being orthogonal to the driver shaft.

13. The binding device according to claim 10, wherein the driver attachment portion has an acting portion that is contactable with the driver shaft to receive a force for moving the driver in the driving-in direction and a force for moving the driver in an opposite direction opposite to the driving-in direction.

14. The binding device according to claim 10, further comprising:

an operating component configured to operate the driver.

* * * * *